United States Patent
Gillett

(12) 
(10) Patent No.: US 12,179,860 B2
(45) Date of Patent: Dec. 31, 2024

(54) MODULAR ROBOTIC VEHICLE COMPRISING WHEELED LEG ARRAY

(71) Applicant: Carla R. Gillett, Sacramento, CA (US)

(72) Inventor: Carla R. Gillett, Sacramento, CA (US)

(73) Assignee: Carla R. Gillett, Sacramento, CA (US)

( * ) Notice: Subject to any disclaimer, the term of this patent is extended or adjusted under 35 U.S.C. 154(b) by 659 days.

(21) Appl. No.: 17/235,355

(22) Filed: Apr. 20, 2021

(65) Prior Publication Data

US 2021/0276642 A1 Sep. 9, 2021

Related U.S. Application Data

(63) Continuation-in-part of application No. 16/873,674, filed on Dec. 18, 2019, now abandoned.

(51) Int. Cl.
*G06F 17/00* (2019.01)
*B62D 57/028* (2006.01)
*G05D 1/00* (2006.01)

(52) U.S. Cl.
CPC ......... *B62D 57/028* (2013.01); *G05D 1/0022* (2013.01); *G05D 1/0251* (2013.01); *G05D 1/027* (2013.01); *G05D 1/0274* (2013.01); *G05D 1/0278* (2013.01)

(58) Field of Classification Search
CPC .. B62D 57/028; B62D 57/024; G05D 1/0022; G05D 1/0251; G05D 1/027; G05D 1/0274; G05D 1/0278; G05D 2201/0212; G05D 1/0011; G05D 1/0246; G05D 1/0891; B60K 2007/0038; B60K 2007/0092; B60K 7/0007; B60K 17/30; B60L 2200/14; B60L 2260/34; G01S 13/862; G01S 13/865; G01S 13/867; G01S 13/931; Y02T 90/16; B25J 5/007

USPC ........................................................ 180/187
See application file for complete search history.

(56) References Cited

U.S. PATENT DOCUMENTS

| | | | | |
|---|---|---|---|---|
| 8,430,192 | B2* | 4/2013 | Gillett | H04M 1/72412 180/2.2 |
| 9,102,331 | B2* | 8/2015 | Bluethmann | B62D 7/026 |
| 9,254,866 | B2* | 2/2016 | Dawson | B60K 17/30 |
| 9,266,518 | B2* | 2/2016 | Fraser-Chanpong | B60W 50/023 |
| 11,260,717 | B2* | 3/2022 | Gao | B62D 61/12 |

(Continued)

OTHER PUBLICATIONS

Supervised_control_of_cooperative_multi-agent_robotic_vehicles (Year: 2002).*

*Primary Examiner* — Ronnie M Mancho

(57) ABSTRACT

The application discloses a modular robotic vehicle or (MRV) including a chassis and body having any shape and dimension to include an enclosed cab in which passengers are seated therein or a passenger to ride on a seat without an enclosed cab. The vehicle's modular chassis further comprising leg array rotatably connected therein, the leg array including actuators causing flexing and bobbing motion for keeping the MRV stabilized when traversing over various ground surfaces in indoor or outdoor environments. The leg array providing walking and steering capability allowing the MRV to transverse during a navigation mode, the wheel providing differential steering propulsion or braking capability, such that the wheel operates like a foot when powered off during a walking mode and rotates when powered on during a drive mode, the MRV to transport passengers and/or cargo.

16 Claims, 11 Drawing Sheets

(56) References Cited

U.S. PATENT DOCUMENTS

2011/0162896 A1* 7/2011 Gillett .................... B60K 35/10
                                                                  180/2.2
2015/0134202 A1* 5/2015 Dawson ............... B60K 17/356
                                                                  701/41

* cited by examiner

MODULAR ROBOTIC VEHICLE COMPRISING WHEELED LEG ARRAY

CROSS REFERENCED TO RELATED APPLICATIONS

A notice of issuance for a continuation in part in reference to patent application Ser. No. 16/873,674, titled: Modular Robotic Vehicle, filing date: Dec. 18, 2019, and related to parent application; Robotic Omniwheel Vehicle, U.S. Pat. No. 8,430,192 B2, Apr. 30, 2013; Robotic Omniwheel, U.S. Pat. No. 9,586,471 B2, Mar. 7, 2017; Yoke Module System for Powering a Motorized Wheel, U.S. Pat. No. 9,902,253 B2, Feb. 27, 2018; Self-Balancing Robot System Comprising Robotic Omniwheel, U.S. Pat. No. 10,625,593 B2, Apr. 21, 2020; Application Ser. No. 17/145,342-Autonomous Passenger Vehicle System, filed Jan. 10, 2021, CN: 2480, unit 3618, published as: US 2021-0139103 A1, on May 13, 2021; Application; 17146484-Robot and Drone Game System, filed Jan. 11, 2021, CN: 1092, unit published as: US 2021-0132626 A1, on May 26, 2021; Application Ser. No. 17/128,055-Modular Delivery Vehicle System, filing date: Dec. 19, 2020, CN: 5712, (continuation in part of) Ser. No. 15/993,609. published as: US 2021-0132625 A1, on May 6, 2021.

FIELD

The embodiment of the application relates to a vehicle utilizing four individual leg arrays with drive wheel components that enable a vehicle to traverse varied terrain. In a particular aspect, each leg array comprises hip, knee and ankle joint actuators provide various degrees of freedom to raise and lower the vehicle. In a further aspect, a modular robotic vehicles that is capable of transitioning between an autonomous mode, a driving mode and a walking mode for transporting passenger(s) and/or transporting cargo.

BACKGROUND

The present modular robotic vehicles use steering actuators to steer an arrangement of drive wheel mechanism to drive holonomic directions or crab drive. The modular robotic vehicle uses a drive wheel having a disc brake and a shock absorption device placed directly at the wheel axis, the drive wheel provides propulsion to drive over terrain but is limited to counter stabilize the vehicle to remain level when driving on uneven terrain, what is needed is a vehicle having the characteristics of compact structure and light weight drive wheel design compared to the common drivetrain and differential steering system.

SUMMARY

The present application offers a modular robotic vehicle comprising all-wheel steering capability by a plurality of four leg arrays with wheels configured to robotically operate allowing the modular robotic vehicle to step, walk or drive with traverse steering and rocking motion on roads and over various surfaces. The beneficial effects brought by the technical scheme of the modular robotic vehicle (MRV) can be enhanced to a greater extent through actuators situated on each leg array in which provide agile flexing adaptability to raise and lower the MRV. In terms of navigation, the MRV utilizes a control system associated with autonomous navigation for engaging driving mode and walking mode actions. Accordingly the MRV control system remotely operates associated with user input or with teleoperators, and cloud computing to control the motion and position of the MRV in indoor and outdoor settings.

In various elements the modular robotic vehicle comprises a unique chassis rotatably connected to leg array comprises actuators which work as shock absorbers and adjust height, a body connecting to the chassis, the body and chassis forming a vehicle characterized as; a vehicle to transport passengers, cargo, or to operate as a wheelchair, scooter, ATV, planetary rover, or other modes of transportation. In various elements the leg array comprising at least one wheel, the wheel including a motor connecting therein, the wheel is rotatably connected at an end of the leg, the wheel providing right and left differential steering propulsion and braking capability, the wheel can function like a foot when powered off.

In various elements the modular robotic vehicle comprises actuators and motors of the leg and wheel being powered by at least one of; electricity, pneumatics, hydraulics or nuclear-powered perceivably during planet exploration.

In various elements the modular robotic vehicle comprises a perception system utilizing an array of sensors and cameras, the perception system's sensors and cameras associated with detecting objects and for capturing images surrounding the MRV, a positioning system utilizing GPS generating route, and a navigation system operated by semiautonomous and/or autonomous drive modes associated with walking motion and/or driving motion.

In various elements upon which the MRV is controlled by a present user provides user input, through control system processors and algorithms providing high level performance instructions accordingly based on protocol assignments from least one of; a present user 110 of the MRV, a control center, associated with cloud computing networks, algorithms configured for controlling motion placement of the leg array and controlling motion of the wheel such that the MRV achieves four-wheel steering motion and actuated driving states, and/or the MRV achieves robotic motion states to step or walk over terrain or obstacles based on the perception system, the positioning system, the navigation system.

In various elements the modular robotic vehicle associated with a control center providing real-time administration by teleoperation processes, or an assigned teleoperator to determine motion, position or performance context of the MRV according to an assignment achieved by one of, the autonomous driving mode, a teleoperating driving (ToD) or one or more control center teleoperators providing teleoperator instruction (ToI) for controlling one or more MRVs to operate in indoor or outdoor environments.

BRIEF DESCRIPTION OF THE DRAWINGS

In order to more clearly illustrate the technical solutions in the embodiments of the present application, the drawings needed to be used in the description of the embodiments are briefly introduced below, and it is obvious that the drawings in the following description are only some embodiments of the present application, and it is obvious for those skilled in the art to obtain other drawings based on these drawings without creative efforts.

(Removed)

Figure 2:
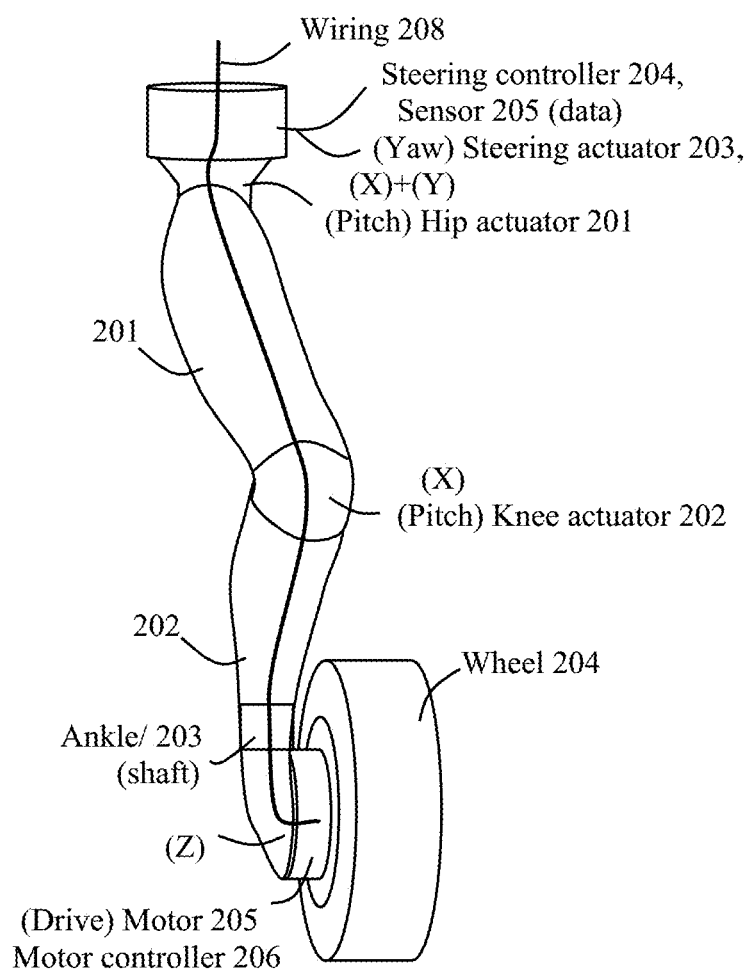
Figure 2A:
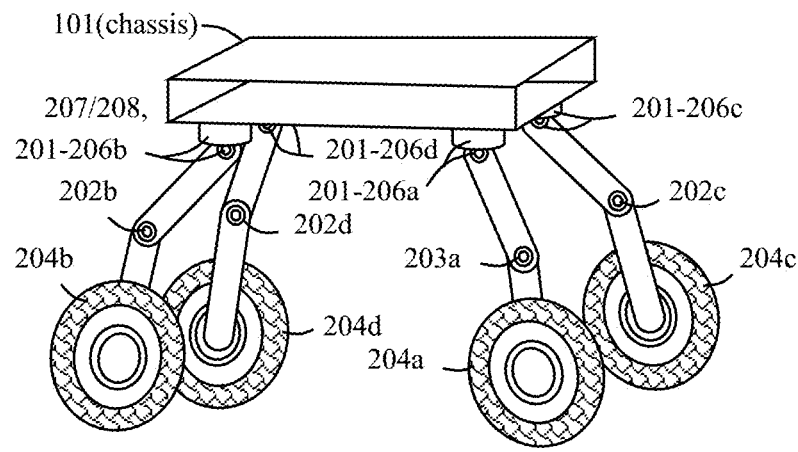
Figure 2B:
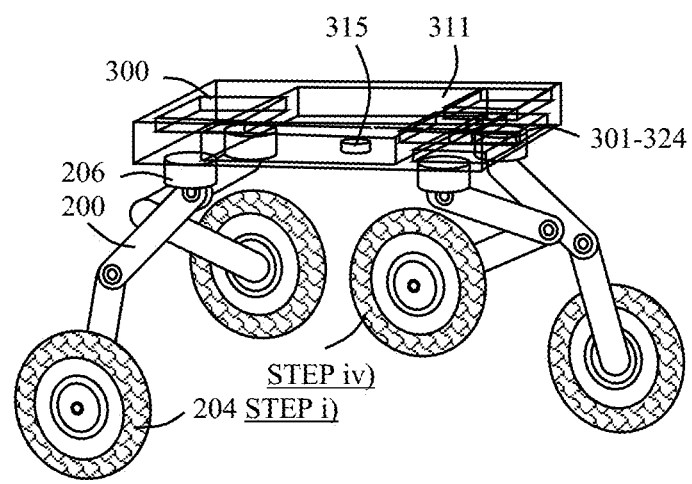

FIG. 2, FIG. 2A and FIG. 2B are perspective views of a leg array 200 in accordance with the present application.

Figure 3:
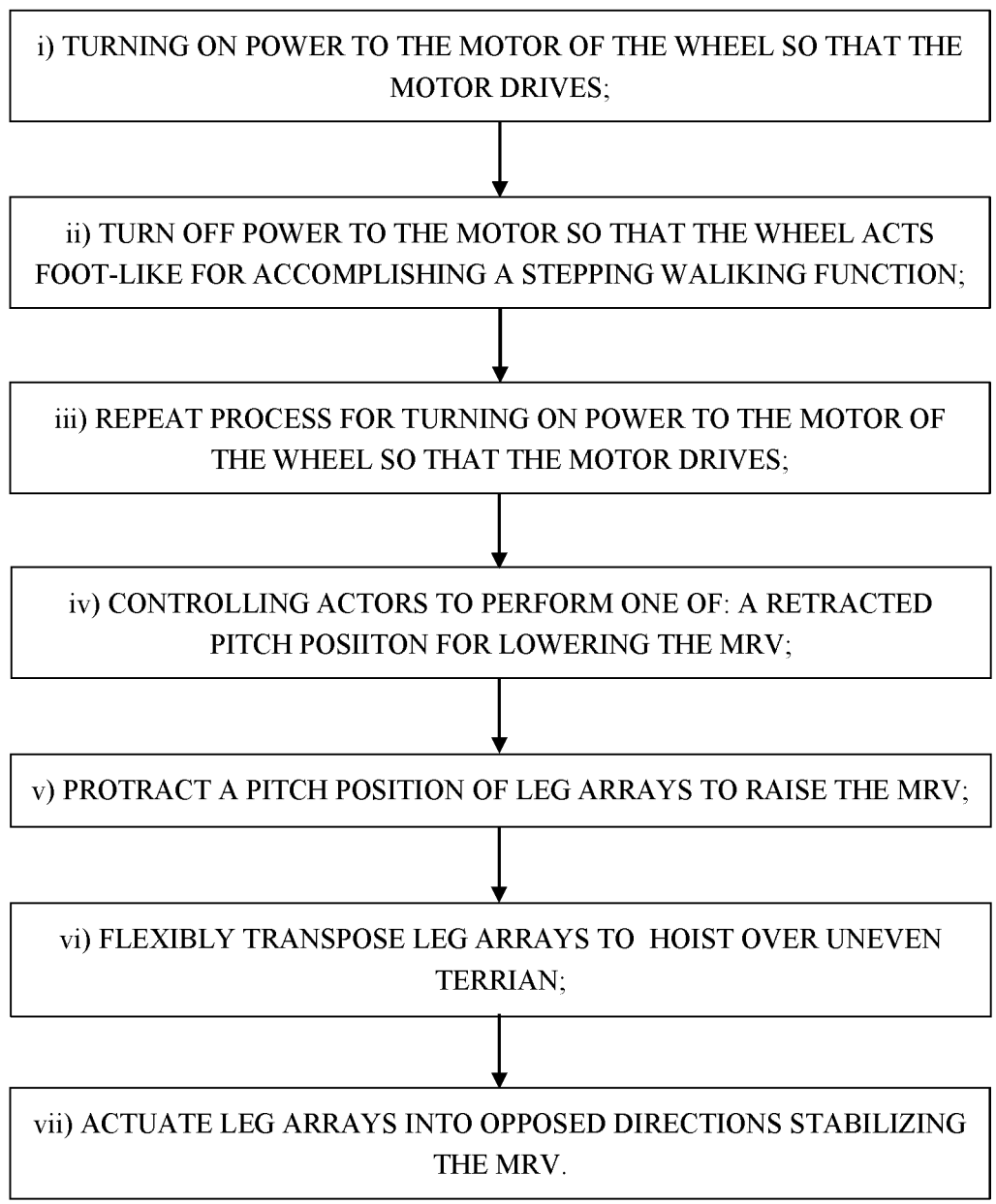

FIG. 3 is a control system flowchart 300 of performance steps in accordance with the present application of the MRV 100 in accordance with the present application.

Figure 4:
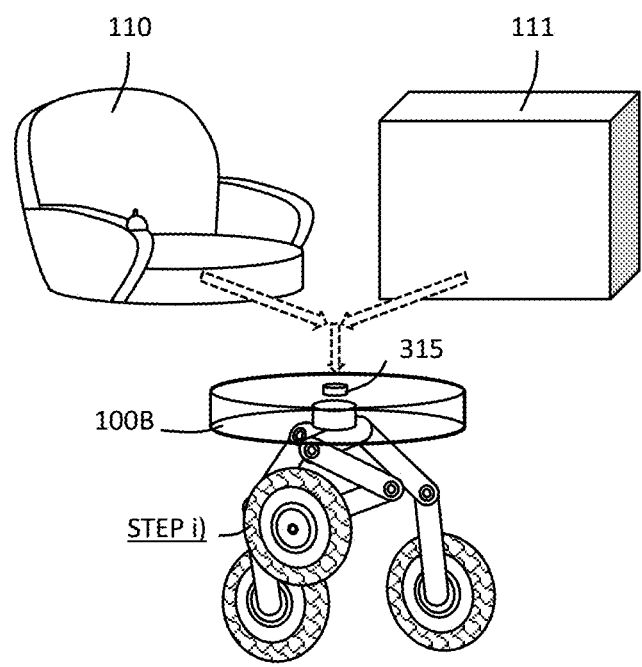

FIG. 4 is a perspective view of a MRV 100B comprising chassis for coupling three leg arrays, a seat configuration or a cargo configuration in accordance with the present application.

Figure 4A:
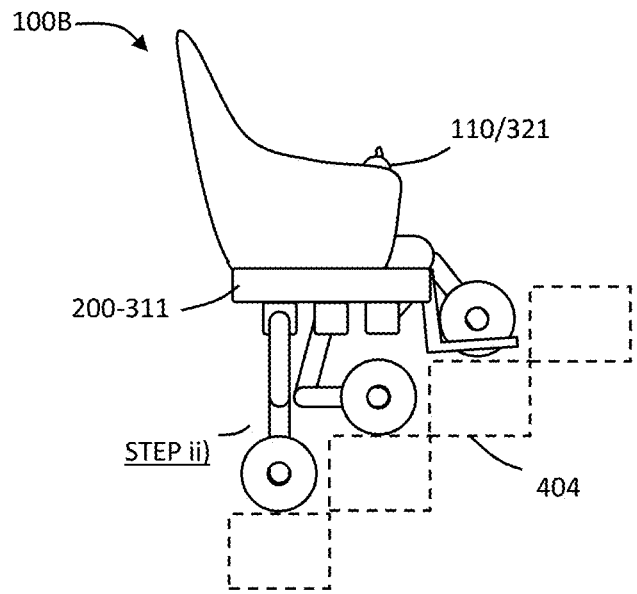
Figure 4B:
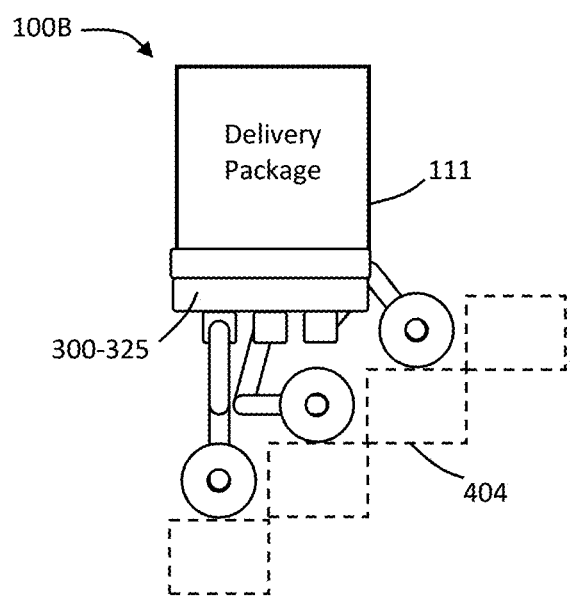

FIG. 4A and FIG. 4B are side views of the MRV 100B stair climbing in accordance with the present application.

Figure 5A:
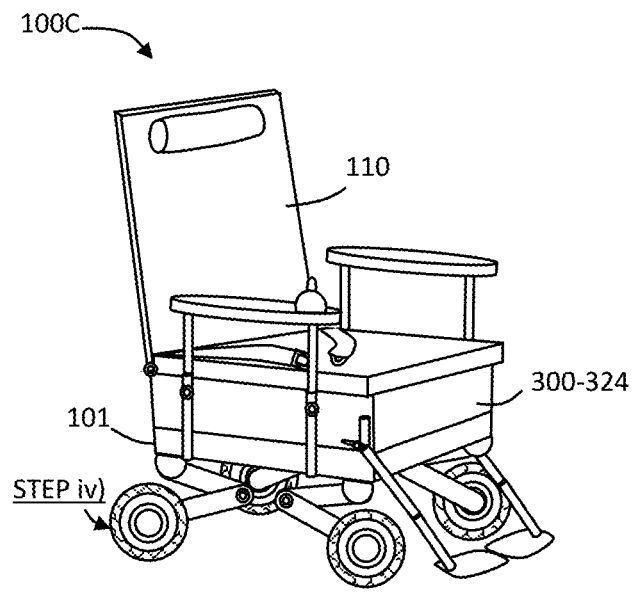
Figure 5A:
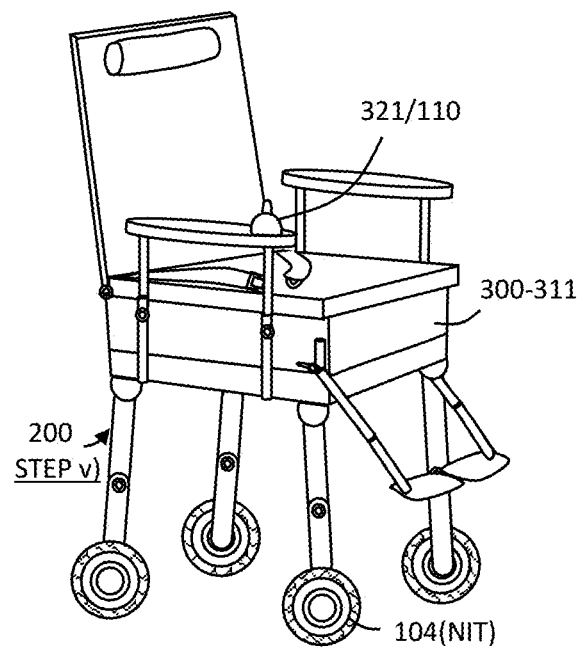

FIG. 5A and FIG. 5AA are perspective views of a modular robotic vehicle 100C with four actuated leg arrays for driving configurations in accordance with the present application.

Figure 6:
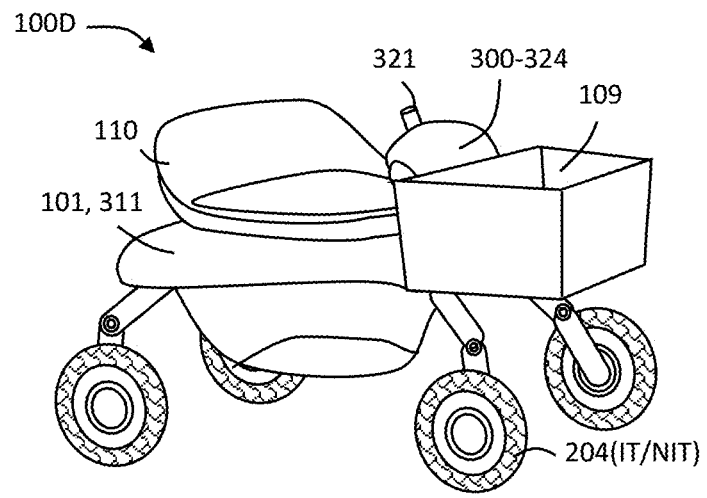

FIG. 6 is a perspective view of a modular robotic vehicle 100D with four actuated leg arrays for driving configurations in accordance with the present application.

Figure 7:
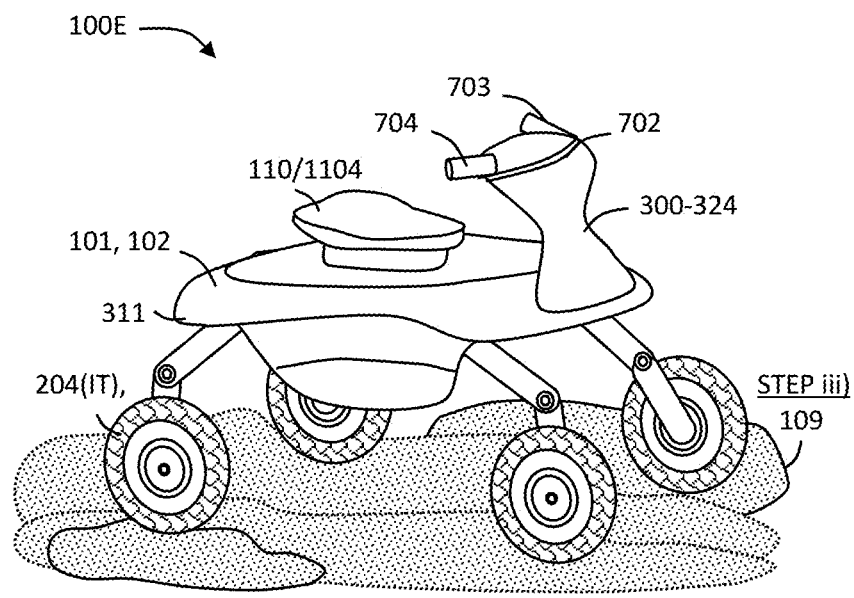

FIG. 7 is a perspective view of a modular robotic vehicle 100E with four actuated leg arrays for driving configurations in accordance with the present application.

Figure 8:
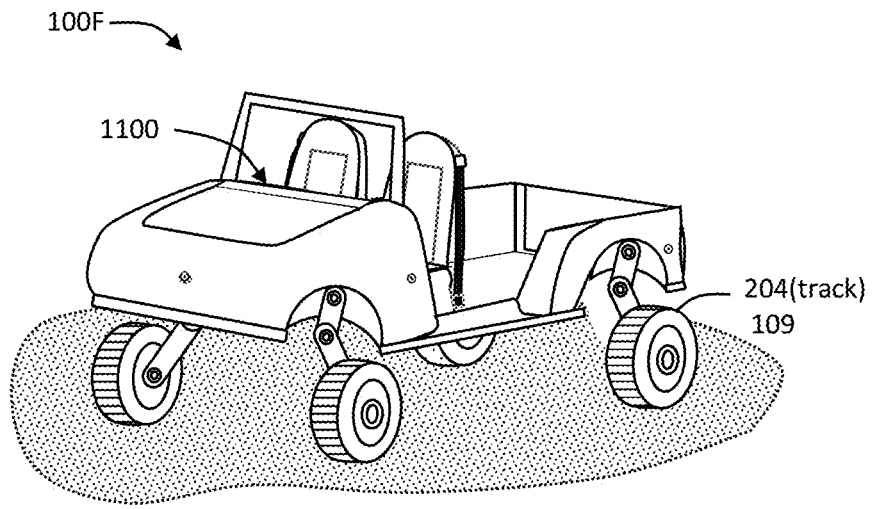

FIG. 8 is a perspective view of a modular robotic vehicle 100F with four actuated leg arrays for driving configurations in accordance with the present application.

Figure 9:
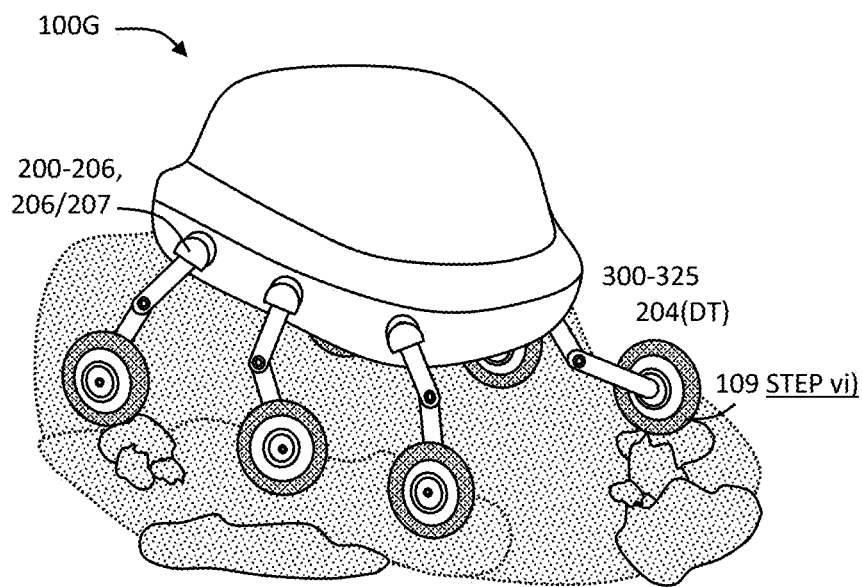

FIG. 9 is perspective view of a modular robotic vehicle 100G with six actuated leg arrays for driving and walking configurations in accordance with the present application.

Figure 10A:
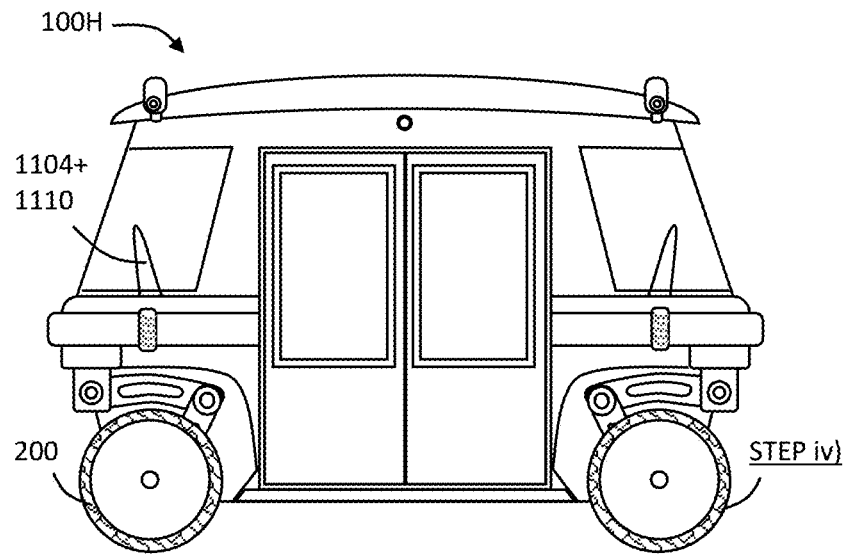

FIG. 10A is a side view of a modular robotic vehicle 100H with four retracted leg array for parked configuration in accordance with the present application.

Figure 10B:
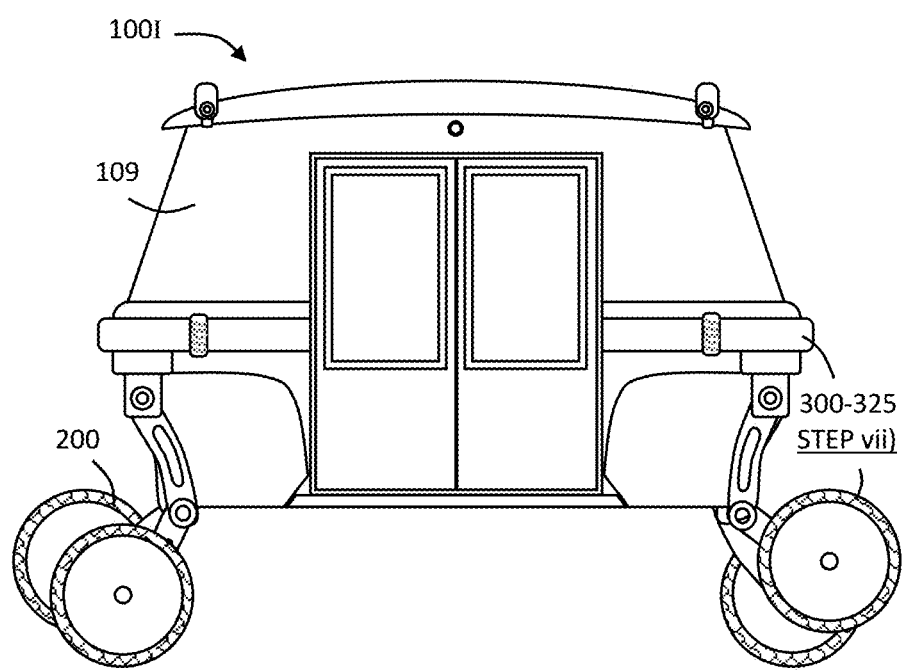

FIG. 10B is a side view of a modular robotic vehicle 100HH with four extended leg array for driving or walking configurations in accordance with the present application.

Figure 11:
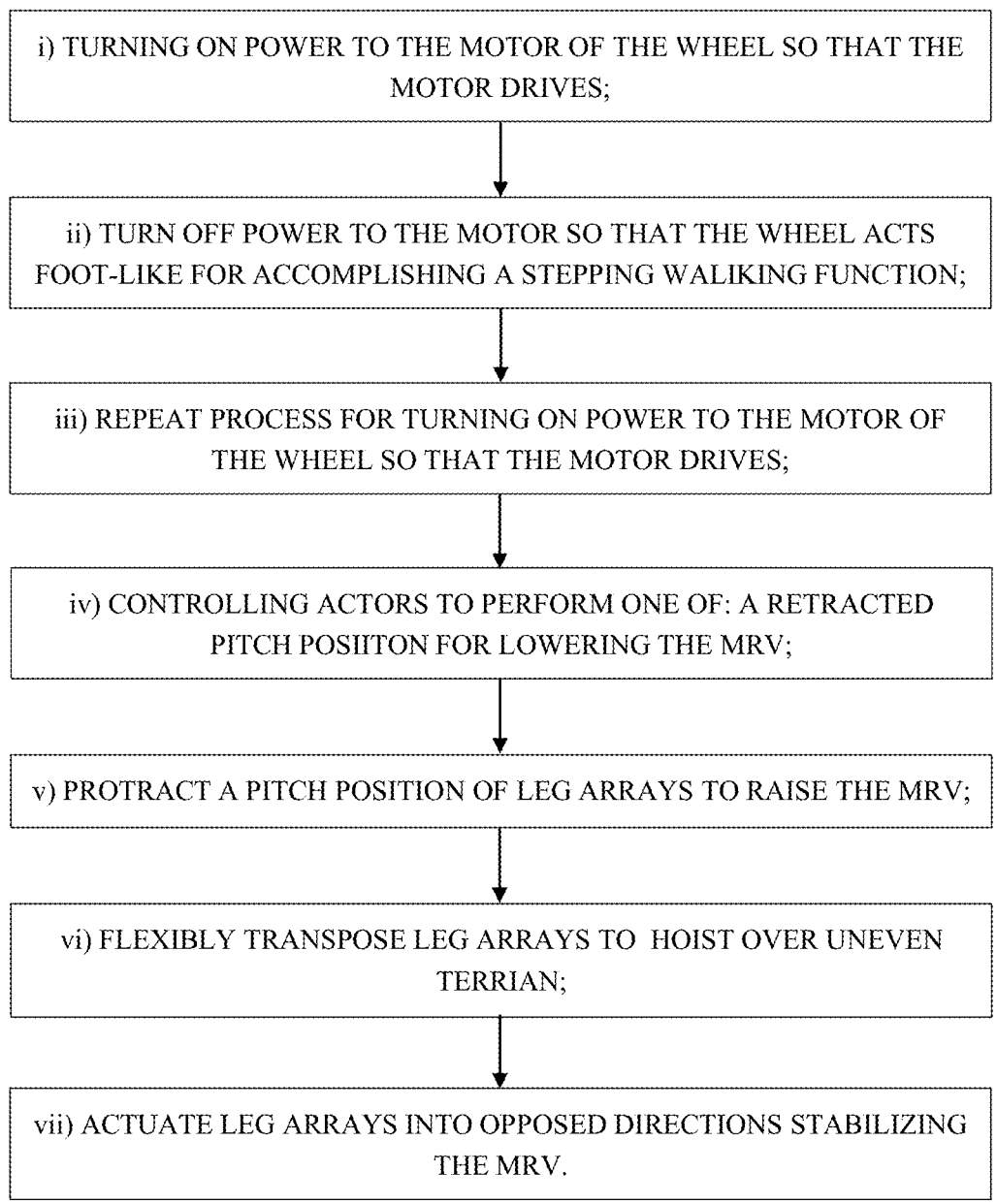

FIG. 11 is a cut through view of the cab components 1100 in accordance with the present application.

DETAILED DESCRIPTION OF THE DRAWINGS

The present application offers a modular robotic vehicle or (MRV) comprising a unique chassis 101 rotatably connected to a plurality of leg arrays 200 comprising actuators which work as shock absorbers and adjust height, and provide four-wheel steering capability respectively to transport passengers and/or cargo. The modular robotic vehicle 100A-HH are configured for operating environments, as exampled in the following embodiments 109.

The present MRV comprises processors and algorithms programmed for providing high level performance instructions accordingly based on protocol assignments from least one of; a present user 110 of the MRV. Wherein a control center associated with cloud computing networks is systematically configured for controlling motion and placement of the leg array and configured for controlling motion states of the wheel such that the MRV achieves four-wheel steering motion and actuated driving states of the MRV achieves stepping motion and or waking motion such that the MRV can walk over terrain or step over obstacles. Accordingly the MRV achieves stepping motion and walking motion based on the perception system, GPS positioning system, a navigation system which allows to remain level when stepping, walking and driving on slanted pathways. The beneficial effects brought by the technical scheme of the modular robotic vehicle can be enhanced to a greater extent through leg array which provide agile flexing adaptability to raise and lower the MRV and as well, the MRV utilizes a control system 300 associated with autonomous navigation or engaging driving and walking modes and associated with teleoperators, and associated with cloud computing to control the motion and position of the MRV.

The MRV comprises actuators and motors that are powered by at least one of; electricity, pneumatics, hydraulics or nuclear-powered perceivably during planet exploration.

The present application offers a modular robotic vehicle comprising a perception system utilizing an array of sensors and cameras, the perception system's sensors and cameras associated with detecting objects and for capturing images surrounding the MRV, a positioning system utilizing GPS generating route, and a navigation system operated by semiautonomous and/or autonomous drive modes associated with walking motion and/or driving motion.

The present application offers a modular robotic vehicle comprising algorithms providing high level performance instructions according to protocol assignments from least one of; a present user (manned or remote) 110, a control center, cloud computing networks, and algorithms configured for controlling motion and placement of the leg array and controlling motion of the wheel based on the perception system, the positioning system, the navigation system.

The present application offers a modular robotic vehicle associated with a control center providing real-time administration by teleoperation processes, or an assigned teleoperator to determine motion, position or performance context of the MRV according to an assignment achieved by one of; the autonomous driving mode, a teleoperating driving (ToD), or one or more control center teleoperators providing teleoperator instruction (ToI) for controlling one or more MRVs to operate in indoor or outdoor environments.

The present application offers a modular robotic vehicle comprising modular design that significantly decreases weight and size, and the modular design allows modifying the leg array 200 to operate with one of spring dampers, pneumatics, hydraulics or nuclear power for planetary missions.

The present application offers a modular robotic vehicle comprising a unique body 102 configuration characterized as one of, a SUV, a cart, a wheelchair, a scooter, an ATV, a truck, a six legged ATV, a passenger van, a cargo van 100I, an amusement park ride or other modes of transportation are possible with respect to policing, search and rescue missions or scientific exploration and disclosed herein.

Figure 1:
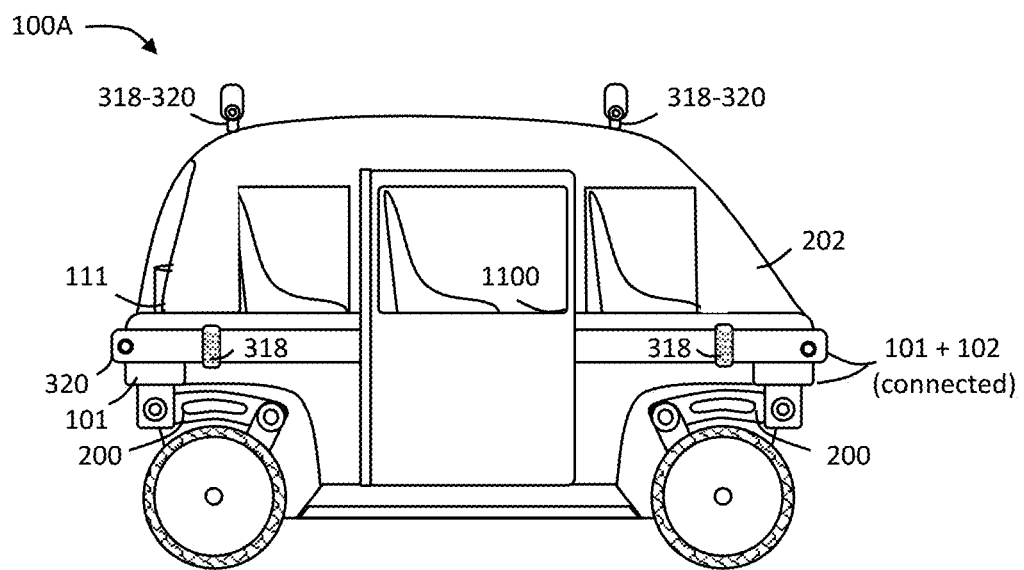
FIG. 1 is a side view of a modular robotic vehicle 100A with retracted leg and wheel configurations in accordance with the present application.

In greater detail FIG. 1 illustrates the SUV identified as MRV 100A having a compact chassis 101 and light weight body 102, the enhanced chassis 101 is connected to a series of four or more leg arrays 200 each having drive wheels 204 which work individually for propelling the MRV 100A with all-wheel steering capability to transport passengers 1110 and/or cargo 111.

In an embodiment of the MRV 100A, wherein the chassis 101 couples to a steering actuator 207 which is connectively linked to a control system 300, the control system 300 controls motion and placement of the MRV 100A.

In various elements, the beneficial effects of the MRV 100A utilizes a collision avoidance and navigation arrangement in communication with processors includes a plurality of sensors and cameras configured to detect objects about the MRV 100A and controlling motion and positioning of the MRV 100A. To make the objects, technical solutions and advantages of the present application clearer, embodiments of the present application will be described in further detail below with reference to the accompanying drawings.

In greater detail FIG. 2 illustrates a leg array 200 comprising an upper leg unit 101, a lower leg unit 202, an ankle 203 connected to a wheel 204, a motor 205 a motor controller 206, and wiring 209, respectively the motor 105 providing (Drive) Z axis. The upper leg unit 101 couples to a hip actuator 201(A) providing (Pitch) X axis of rotation, a knee actuator 202(A) providing (Pitch) X axis, an ankle 203 having a shaft 103 (shaft) wherein a built-in actuator providing Y axis is possible. The leg array 200 further comprises a steering actuator 204(A) providing (Yaw) to rotate the hip actuator 201(A) (Pitch) X axis, together the hip actuator 201(A) and the steering actuator 204(A) provide multi-directional motion states, such that the hip actuator 201(A) raises the upper leg unit 101 and the steering actuator 204(A) causes pivot action at the upper leg unit 201, both steering actuator 204A) and hip actuator 201(A) accomplishing a stepping/walking function 205 (WF) during a walking mode 310 or both steering actuator 204(A) and hip actuator 201(A) accomplishing traverse driving functions 206 (DF).

The leg array 200 is configured with wiring 2089 which extends therethrough, the wiring linking leg array components; 105, 106, 201-204 to the actuator controllers and motor controller, respectively, systematically the actuators 201(A)-204(A) (with built-in controllers and receivers) and the motor controller 106 receive regulated power via the control system components 301-310.

Wherein the actuators to flexibly raise or lower the chassis 101 to stabilize the MRV 100 by providing various degrees of motion states for stepping, walking, and driving, wherein the upper leg unit 201 and the lower leg unit 202 provided to transfer power through wiring 209 to power the motor 105 and motor controller 106 connected on the control system 300.

In an embodiment the electric motor provides a brake arrangement 206 for preventing motion to the wheel 104 and wiring for braking 108 which connects to a controlled power source with the control system 300 regulates battery 311 (DC power) to control the leg's actuators 201-204 and motor 105 and motor controller 106 components.

In an embodiment the electric motor provides a brake arrangement for preventing motion to the wheel and wiring 209 which connects to a controlled power source associated with a control system 300 to regulate DC battery 311 power to the motor 105 via a motor controller 106 controlling velocity involving driving function 107 and a braking function 108, the hip actuator 201, knee actuator 202, steering controller 204, the ankle 103 which may or may not utilize an actuator, and internal sensors provide data to the control system 300, the sensors 318-320, see FIG. 3.

In one embodiment of the leg array may provide a gearing system and gear bearings for heavy duty MRV and may utilize a spring damper 207 and/or a clutch mechanism 208 disposed on the chassis 101 provided additional shock absorption at the steering controller section, see FIG. 9.

The present invention offers modular leg arrays rotatably connected to the vehicle chassis 101, respectively the articulate leg causing flexing motion and leveling stability for keeping the MRV 100A to a user 110 transport passengers 1110 and/or cargo 111 in operating environments like terrain 109.

In greater detail FIG. 2A illustrates a perspective view of the chassis configuration, wherein the chassis houses a DC battery 311 and various computers of the control system. Respectively the leg array 201-204 provide shaft accommodating wiring connection between a wheel hub and a motor of the wheel, the hub coupling to a motor, the hub couples with the ankles shaft, the ankle 203 coupling to the end of the lower leg unit 202.

In various elements, control system 300 provides processors 305 linking to motor sensors 313, actuator sensors 314, gyroscope 315 or IMU, and other associated sensors; LIDAR 318, RADAR 319, cameras 320.

In various elements, the leg array 200 alternatively retracts upon powering off, and operates to retract and/or protract when powered on.

In one embodiment of the leg array components are power from at least one of; electricity, hydraulics, pneumatics, hybrid motor system, hydrogen or fuel.

Wherein the wheel further comprising an outer perimeter forming one of; a tire, a track, a noninflatable composite, or an arrangement thereof, identified in FIG. 5AA through FIG. 9.

In one embodiment of the leg array actuators may provide a gearing, bearings, an actuated ball and socket joint.

In various elements, the beneficial effects brought by the leg array's wheel 104 and motor 105 and wiring 209 which indirectly connects to a controlled power source provided by batteries 311, or provided by alternative power like hybrid vehicle technology, preferable the batteries 311 charged from clean energy sourced naturally from solar.

FIG. 2A and FIG. 2B show the actuators 201, 201, 202 or when configured, may utilize a spring damper 207 and/or a clutch mechanism 208 disposed on the chassis 101, when combined or when independent each work to stabilize and support the MRV.

In various motion states, the leg array respectively, the actuators 201, 201, 202 flexibly cause one or more actions; raising, lowering, bobbing and undulating so that MRV is stabilized when traversing over various surfaces, and/or flexibly transposing to hoist the MRV over uneven terrain as the wheels 104 of the leg array 200 provide various degrees of motion states for stepping, walking, and driving.

In various elements, the plurality of leg arrays 200 capable for providing one of; retracting a pitch position for lowering the MRV; protracting pitch position to raise the MRV, traversing to steer over a route, or actuate into opposed respective directions to stabilize the MRV.

The present invention offers modular leg arrays rotatably connected to the vehicle chassis 101, respectively the articulate leg causing flexing motion and leveling stability for keeping the MRV 100A level when driving on slanted pathways, the MRV's leg array 200 associated with pivotal hip joint, knee joint and ankle joint providing pitch states and the wheel 204 combines walking and rolling capabilities for energy efficient motion. The wheel 104 is configured to smoothly transition through transverse terrain like ramps, stairs, curbs, trenches, hillsides, by tiptoeing, walking and driving.

In various configuration the leg arrays 200 are set in a series with respect to three or more leg array, as the following embodiments are detailed hereafter.

In greater detail FIG. 3 is a schematic flowchart of the control system 300 configured for controlling switching driving functions or braking functions associated with the walking mode and the driving mode, accordingly the process including:
  i) to turn on power to the motor of the wheel so that the motor 105 starts driving functions;
  ii) to turn off power to the motor 105 of the wheel 104 so that the wheel stops driving 108 function; to turn on power to braking function 107 so that the wheel accommodates foot functions 109 for stepping;
  iii) repeat process to turn on power on the motor's driving function 206 of the wheel causing the wheel 104 to accommodate skating and driving function 107 again.
  iv) a retracted a pitch position of the leg array 200 for lowering the MRV;

v) a protracted pitch position of the leg array 200 to raise the MRV;

vi) flexibly transpose the leg array 200 to hoist the MRV over uneven terrain;

vii actuate into opposed respective of the leg array 200 directions to stabilize the MRV.

Respectively, the control system controls the actuators 201, 201, 202 flexibly cause one or more action; raising, lowering, bobbing and undulating so that MRV is stabilized when traversing over various surfaces, and shows various elements the leg arrays 200 configured to flexibly transposing and hoisting the MRV over uneven terrain, and as the wheels 104 of the leg array provide various degrees of motion states for stepping, walking, and driving.

Respectively, the control system controls the modular robotic vehicle basically functions autonomously through algorithms 301, memory 302, software programming 303, multiple computers 304, a perception system 306 and a positioning system 307 or GPS 307 for generating a current location, a positioning system utilizing GPS for establishing a current location, generating routes, mapping destinations.

The control system 300 based on algorithms 301 for controlling motion and placement of the MRV, the computers having processors 305 linking to perception system 307, positioning system 306 and to actuator and motor components of the plurality of leg arrays 200.

Accordingly, the perception system 306 providing sensors and cameras disposed on portions of the chassis and body which link to the control system, wherein the control system configured for controlling motion and position of the plurality of leg arrays during the walking mode and/or during the driving mode of the MRV based on sensor and cameras data linking to the control system, and provides a gyroscope or accelerometer to maintain an appropriate stabilized state whist traversing during a walking mode, during driving mode.

Accordingly, the perception system 306 utilizes an array of sensors and cameras with detecting objects and for capturing images surrounding the MRV. Respectively, an operation mode provides one of; a semiautonomous mode 308 or autonomous mode 309, a walking mode 310, a driving mode 311 provides a sleep mode 312 for an external charging process.

The processors 305 linking to motor sensors 313, actuator sensors 314, gyroscope 315 or IMU, and other vehicle associated sensors leg array 200 and cab 1100 components, wherein the sensors and cameras providing performance 316 and object data 317.

The sensors and cameras listed herein are in communication with the processors 305, the sensors configured to detect objects about the MRV to avoid collision or contact with the detected objects, the sensors may include one or more LIDAR 318 devices, RADAR 319, and other sensor devices to obtain object data surrounding the MRV, the cameras 320 provide video and 3D imagery commonly use nowadays in most robot and vehicles.

Respectively, the MRV basically performs autonomously and requires additional guidance from a present user 110 instruction through wireless communication from external controllers like a joystick controller 321, a remote controller 322, or by onboard controllers housed within the cab 1100 which may include one of; a steering wheel 1106 to control steering of one or more leg arrays 200 and pedals for throttle 1107 and braking 1108 for controlling the motor 105 of the wheel 104.

Respectively, the control system 300 within the cab 1100 engages a drive-by-wire control system 1109 for selected operation mode 308/312 by a joystick 1105 linked to the control system 300.

Respectively, the control system 300 engages a semiautonomous mode 308 which allows a user 314 to control the MRV, or the control system 300 engages a semiautonomous mode 308 which allows a user 110 to control the MRV remotely by a remote controller 322 through a remote computing system associated with a control network 323.

Respectively, the control system 300 engages the semiautonomous mode 308 which allows a user 110 to control the MRV remotely by a remote controller 322 which functions like a handheld game controller 325 to control steering and position of the MRV whilst riding or from afar.

Respectively, the control system 300 engages the autonomous mode 309 which allows a user 110 to control the MRV remotely by a remote controller 325 for steering the MRV and administering power via remote computers to control operations of the leg array actuators 201, steering controllers 203, motor controllers 206.

The control system's algorithms 301 providing high level performance instructions according to protocol assignments for: controlling motion and placement of the leg array and controlling motion of the wheel 104 based on perception system with data, or positioning system with data; controlling differential steering propulsion or braking capability, such that the wheel operates like a foot when powered off during a walking mode 310 and rotates when powered on during a drive mode 311; controlling motion and placement of the leg array 200 and controlling motion of the wheel 104 based on GPS 307 for generating a planned travel route, sensors for detecting objects and cameras for capturing images; and controlling navigation and steering functions to transport an operator 110, passengers 1110 and/or cargo 111.

The control system when in autonomous mode 309 controls switching functions 109 associated with: a first step to turn on power to the motor of the wheel so that the motor 205 drives 106; a second step to turn off power to the motor 205 of the wheel 204 so that the wheel stops so that the wheel 204 acts foot-like 207 when powered off the wheel 204 (e.g., foot-like 207) accomplishes a stepping function 108; a third step repeats autonomously turning on power to the motor 205 causing the wheel 204 to drive 206.

The control system 300 when in autonomous mode 309 controls switching functions 109 associated with a step to turn off power to the leg array actuators 201-203 and motor 205 during a sleep mode 310.

The control system 300 associated with processors 301 systematically regulating power furnished from batteries 311 or furnished from other power source preferable DC power via batteries 311 charged by an external AC charging station.

The control system configured with a joystick controller 321 controlling plurality of leg arrays during a walking mode and/or during a driving mode based on sensor, camera and GPS data linking to the control system.

The control system configured with a perception system utilizing an array of sensors and cameras, the perception system's sensors and cameras associated with detecting objects and for capturing images surrounding the MRV.

The control system configured a teleoperating driving (ToD) or one or more control center teleoperators providing teleoperator instruction (ToI) for controlling one or more MRVs to operate in indoor or outdoor environments.

The navigation arrangement of the MRV 100 is operated by the control network associated with Bluetooth and Wi-Fi connected smart devices like smartphones, tablets iPads, laptops, PC, and other smart devices, wearable devices, etc.

The navigation arrangement of the MRV 100 is operated by one of; Control Networks 23 associated with Cloud Computing or Quantum Computing (when available).

The control system 300 associated with one of: a wireless communication system linking the control system to a control center providing real-time administration by teleoperation processes, or an assigned teleoperator to determine motion, position or performance context of the MRV according to an assignment; cloud computing networks associated with controlling performance procedures.

The performance data being stored or obtained through Cloud Networks 323 providing one or more teleoperator 324, the teleoperator(s) 324 providing real time instruction 325 to control system processors of the MRV.

The control system 300 further designating authorized and unauthorized locations; and, using the map information and the location information to cause the MRV to navigate away from the unauthorized locations and maintain a location within the authorized locations.

In greater detail FIG. 4 illustrate a tripod like cart identified as MRV 100B comprising chassis for coupling three leg arrays, a seat configuration for accommodating a use 110 or the chassis for coupling a compartment to stow cargo 111 configuration in accordance with the present application. FIG. 4A and FIG. 4B are side views of the MRV 100B stair climbing in accordance with the present application. processors 305 linking to motor sensors 313, actuator or IMU, and other vehicle associated sensors leg array 200 and cab 1100 components, wherein the sensors and cameras provide performance 316 and object data 317.

The chassis view is see-through showing a gyroscope 315, IMU or accelerometers which function to keep the MRV 100B stabilized whilst traversing to step, or transition over a gap, curbs, ramps at approximate slanted heights or as exampled FIG. 4A and in FIG. 4B climbing stairs 404.

Respectively each leg unit is configured with actuators to cause rotation at axis points between the leg units the MRV 100B can be enhanced to a greater extent through the agile motion states achieved by the leg array 200 whereby, each actuator creates flexibly motion states for raising, lowering and undulating to steady the MRV when traversing over various ground surfaces in indoor or outdoor environment adaptability.

In greater detail FIG. 5A and FIG. 5AA are modular robotic vehicles or MRV's 100C including a chassis and body configuration characterized as one of: a wheelchair, a scooter, the scooter providing with cargo compartment. Wherein a plurality of leg arrays connecting to a section of the chassis 101 coupled to four leg arrays 200, and a leg array of the plurality of leg arrays comprising an upper leg unit, a lower leg unit, an ankle, a wheel, the wheel including a motor connecting therein, wherein the leg arrays 200 are shown in a retracted configuration STEP iv) to receive a wheelchair user 110, and the leg arrays traverse in various ways which makes it easier to reposition the wheelchair in tight spots as well as access stairs.

Accordingly, the chassis 101 is configured like a common wheelchair when getting on and off, the user 110 can remove the modifiable leg and foot supports, the seat has seatbelts, and the chair back can be reclined, for driving the user 110 utilizes a joystick controller 321 to control steering and speed.

Accordingly, the joystick controller 321 is connected to the control system 300, the wheelchair user 110 can adjust the height (STEP v) by repositioning the stance of the leg arrays to traverse over terrain 109.

Accordingly, motor sensors, actuator sensors, gyroscope, IMU, receiver, the receiver receive control system signals, and other vehicle associated sensors and cab components 1100.

Accordingly, actuator controllers linking to the plurality of leg arrays, wherein the actuators providing one of; retracted a pitch position for lowering the MRV 100C; protracted pitch position to raise the MRV 100C, or actuate into opposed respective directions STEP vii) to stabilize the MRV 100C. In an alternative the chassis may be a cart having three or more leg as well as, the body can be equipped with a plurality of arms with tool mechanisms for transporting cargo 111.

Accordingly, the control system is associated with a perception system utilizing an array of sensors and cameras, the perception system's sensors and cameras with detecting objects and for capturing images surrounding the MRV 100C.

Accordingly, a positioning system utilizing GPS generating route for mapping location destinations for navigating in a walking mode and/or in a driving mode.

Accordingly, the control system configured with a controller provided by a steering wheel 1106 to control steering of one or more leg arrays 200, and by pedals for throttle 1107 and braking 1108 for controlling the velocity of the drive motor 105, and joystick controller 321 for controlling plurality of leg arrays by a user 110 onboard.

Accordingly, the control system linking to the sensors and cameras disposed on portions of the chassis and body.

Accordingly, the control system configured for controlling motion and position of the plurality of leg arrays during the walking mode and/or during the driving mode of the MRV 100C based on sensor and cameras data linking to the control system.

As FIG. 5AA illustrates, the user 110 uses the joystick controller 321 to raise the MRV 100C at counter height or adjust the user 110 to be at a height for standing up STEP v), and elevating up to counter height, and comprises four wheels 104 using a noninflatable tire (NIT) other STEPS are possible.

In greater detail FIG. 6 is an illustration configured as a scooter identified as MRV 100D for operating in indoor or outdoor use, the chassis 101 comprises a chair platform connected therein a plurality of leg array 200 with wheel 104 for propelling the MRV 100D.

The MRV 100D lowers to a parked configuration to receive a user 110, when onboard, the user 110 utilizes a joystick to control of steering, speed and can adjust the height by repositioning the stance of the leg array, accordingly the four wheels 104 using an inflated or noninflatable tire (IN/NIT).

The MRV 100D operates semiautonomous whereby the user 110 controls the steering, and may provide cab components 1100 for semiautonomous/autonomous driving system 305 configurations.

In greater detail FIG. 7 illustrates an off road vehicle or ATV identified as MRV 100E configured for operating in indoor 120 or outdoor 130 environments, the MRV 100E includes; a chassis 101 and a body 102 in which passengers and/or cargo are carried and a plurality of leg array 200 with wheel 104 for propelling the MRV 100E. Respectively the steering is semiautonomous 208 by a steering column arrangement 702 a drive-by-wire control system 1109 for selected operation mode 308/312 by handle 703, and handle 704 for controlling wheel speed both handles 703/704 and steering column 702 link to the control system 300-324.

Wherein the leg arrays further comprising a spring damper for shock absorption 207 to reduce driving impact when traversing over bolder, gaps, and other ruff obstacles, the four wheels 104 using an inflatable tire (IT).

Accordingly, the MRV 100E is configured actuator controllers linking to the plurality of leg arrays, wherein the actuators providing STEP iii) and other STEPS are possible.

The MRV 100E is configured with a perception system utilizing an array of sensors and cameras, the perception system's sensors and cameras associated with detecting objects and for capturing images surrounding the MRV 100E. Wherein motor sensors, actuator sensors, gyroscope, IMU, and other vehicle associated sensors and cab components.

In greater detail FIG. 8 illustrates a truck exampled as MRV 100F wherein the chassis 101 configured with four leg arrays 200 for propelling the MRV 100F at traverse directions making it easier to reposition over rocky terrain. MRV 100F configured with a chassis and body configuration for an all-terrain vehicle for one of: policing, search and rescue missions or scientific space exploration. Wherein the truck's body provides cab components 1100 shown in FIG. 11.

The wheel 104 (track) is provided for transitioning through sand, mud, ice and snow. Wherein, the leg arrays 200 further comprising a spring damper 207 to reduce bounce impact and the clutch mechanism 208 for traversing smoothly over bolder, gaps, and other ruff obstacles. The four leg arrays adjust the height STEP v) by repositioning the stance of the leg arrays to traverse over terrain 109, or actuate into opposed respective directions STEP vii) to stabilize the MRV 100F to reduce driving impact when traversing.

Accordingly, the MRV 100F is configured actuator controllers linking to the plurality of leg arrays, wherein the actuators providing one of; a retracted pitch position for lowering the MRV 100F, or protracted pitch position to raise the MRV 100F or actuate traverse directions to travel on unlevel paths.

The MRV 100F is configured with a perception system utilizing an array of sensors and cameras, the perception system's sensors and cameras associated with detecting objects and for capturing images surrounding the MRV 100F. Wherein motor sensors, actuator sensors, gyroscope, IMU, and other vehicle associated sensors and cab components.

In greater detail FIG. 9 is an illustration configured as an ATV identified as MRV 100G is configured a plurality of six leg arrays utilizing a wheel 104 including a motor 105 connecting therein, accordingly six wheels 104 using a durable treaded composite (DT). Wherein the chassis 101 configured with four leg arrays 200 for propelling the MRV 100G at traverse directions making it easier to reposition over rocky terrain, the MRV 100G configured with a chassis and body configuration for an all-terrain vehicle for one of: scientific space exploration, sporting events or riding for amusement. Wherein the ATV's body provides cab components 1100 shown in FIG. 11.

In various elements the control system utilizes a positioning system for generating GPS route and mapping locations or travel destinations.

In various elements the control system configured with a controller device controlling plurality of leg arrays during a walking mode and/or during a driving mode based on sensor, camera and GPS data linking to the control system.

Wherein the leg array alternatively retracts upon powering off, and operates when powered on, wherein the power providing from at least one of; DC electricity, hydraulics, pneumatics, hybrid motor system, hydrogen, a nuclear power source is possible for space exploration.

Wherein the leg arrays 200 further comprising a gearing system and gear bearings for heavy duty MRV and may utilize a spring damper 207 and/or a clutch mechanism 208 disposed on the chassis provided additional shock absorption at the steering controller section. The spring damper 207 to reduce bounce impact and the clutch mechanism 208 for traversing smoothly over bolder, gaps, and other ruff obstacles. Accordingly, the MRV 100G is configured actuator controllers linking to the plurality of leg arrays, wherein the actuators providing one of; a retracted pitch position for lowering the MRV 100G, or protracted pitch position to raise the MRV 100G, or actuate into opposed respective directions through one of; STEP iii) and/or a retracted pitch STEP iv) position for lowering the MRV 100E, or protracted pitch position STEP v) to flexibly transpose the leg array 200 to hoist the MRV over uneven terrain, and omni-directional or "crab" steering motions are possible.

The MRV 100G is configured with a perception system utilizing an array of sensors and cameras, the perception system's sensors and cameras associated with detecting objects and for capturing images surrounding the MRV.

In greater detail FIG. 10A illustrates a MRV 100H configured as a van for transporting passengers and/or cargo are carried and a plurality of four leg arrays 200 for propelling the MRV 100H. Wherein the van's body provides cab components 1100 shown in FIG. 11. Respectively the leg arrays 200 further comprising a spring damper 207 for shock absorption to reduce driving impact when traversing over bolder, gaps, and other ruff obstacles. Accordingly, the MRV 100H is configured actuator controllers linking to the plurality of leg arrays, wherein the actuators providing one of; a retracted pitch position for lowering the MRV 100H, or protracted pitch position to raise the MRV 100H, or actuate into opposed respective directions STEP iv) to stabilize the MRV 100H.

In various elements, the MRV 100H is configured with a perception system utilizing an array of sensors and cameras, the perception system's sensors and cameras associated with detecting objects and for capturing images surrounding the MRV 100H. Wherein motor sensors, actuator sensors, gyroscope, IMU, and other vehicle associated sensors and may provide cab components 1100.

In greater detail FIG. 10B illustrates a MRV 100I configured as a van for transporting cargo are carried and a plurality of four leg arrays 200 for propelling the MRV 100I. Wherein the leg arrays traverse through route and obstacles. Accordingly, the MRV 100I is configured actuator controllers linking to the plurality of leg arrays 200 via actuators providing a retracted pitch position for lowering the MRV 100I, or protracted pitch position to raise the MRV 100I, or actuate into opposed respective directions STEP vii) to stabilize the MRV 100I.

In various elements, the MRV 100I is configured with a perception system utilizing an array of sensors and cameras, the perception system's sensors and cameras associated with detecting objects and for capturing images surrounding the MRV 100I. Wherein motor sensors, actuator sensors, gyroscope, IMU, and other vehicle associated sensors and may provide cab components 1100 for semiautonomous/autonomous driving system configurations.

In greater detail FIG. 11 illustrates the cab 1100 for accommodating a user 110 and passengers 1110, wherein a dashboard 1101 is configured with a console 1102 a control panel 1103, and comprising cab controller components including; a by-wire joystick controller 1105 is disposed on the arranged between the two seating units 1104*a*, 1104*b*, a steering wheel 1106 to control steering of one or more leg arrays 200 and pedals for throttle 1107 and braking 1108 for controlling the motor 105 of the wheel 104, wherein the drive-by-wire joystick controller 1105 is disposed on the console between the two seating units 1104*a*, 1104*b*.

Respectively, the control system 300 within the cab 1100, wherein the user 110 engages a drive-by-wire control system 1109 for selected operation mode by a joystick 1105 linked to the control system 300.

The operating modes including; a semiautonomous mode 308 or autonomous mode 309, a walking mode 310, a driving mode 311 or provides a sleep mode 312.

Wherein the control panel 1103 providing a lock and key security system for user accessing use of the MRV 100D-100H. Accordingly, the control panel 1103 providing user 110 interface and is associated with external wireless communication I/O devices which may utilize a smartphone, respectively the control panel 1103 providing a virtual display for selecting menu settings relating to user preferences associated with real-time administration or performance procedures for controlling the MRV to operate in indoor or outdoor environments or provides remote controlled driving to enable the user 110 to have a rest, and for passenger 1110 to enjoy the ride.

The MRV being driven in response to by-wire commands using electrical energy supplied by a high-voltage energy storage system (ESS) and an associated power electronics module. Motion control is provided by a distributed control network having a master controller and multiple "embedded" local controllers, i.e., positioned within the structure of the leg array 200 in proximity to the particular vehicle function being controlled.

In various elements, the controller system components have a corresponding steering, propulsion, or braking function for a given drive wheel 104 disposed on corners or sides of the chassis 101. Multiple levels of control redundancy are provided, with a plurality of controllers used for operationally designated functions 107/108. Additionally, a wide spectrum of possible operating modes is enabled by the present design. Other operating modes may include the controlling of; two-wheel steering to turn left or right directions, or four-wheel steering, diamond, and omni-directional or "crab-like traversing" steering modes, as well as a sleep mode when idle.

Additionally, each leg array 200 houses individual steering, propulsion, braking, and suspension systems. Independent control of each leg array 200 is supervised by the master controller and backed up by a redundant secondary master controller, with various embedded controllers communicating as needed with the master controller(s) via Ethernet for Control Automation Technology (Ether CAT) or another suitable high-speed connection.

In various elements, the user 110 input or commands are transmitted from various user input devices by-wire and received by the master controller(s). The user input devices may include a brake pedal, an accelerator pedal, a human machine interface (HMI) screen, and a steering wheel, with a joystick optionally replacing some or all of these devices.

In various elements, the control system 300, upon receipt and processing of the by-wire input commands, issues individual by-wire commands to each of the embedded controllers. The entire control operation is achieved by-wire as noted above, i.e., without direct mechanical linkages between the user input devices and the steering, propulsion, or braking subsystems being controlled in response to the user's inputs commands.

In various elements, the MRV docking capabilities are also provided in an optional embodiment. Such docking capabilities wirelessly without mutual contact in another embodiment. Once docked, the vehicles are able to exchange or share control data and electrical power as needed. The docked MRV concept as disclosed herein may allow a user to enjoy an extended travel range and expanded cargo/passenger capacity when desired, as well as coordinated power system management functionality.

For instance, a lead MRVS in a chain of linked vehicles may assume all control functions of the trailing MRVS, such that a user of the lead vehicle provides all steering, braking, acceleration commands and drive mode selections. In such a configuration, the various motors of the trailing vehicle(s), particularly those housed within the leg array 200, can be used to generate electricity for extending the overall range of the linked vehicles.

The MRV embodiments described above are merely illustrative, and for example, the flowchart and diagrams in the figures illustrate the architecture, functionality, and operation of possible implementations of apparatus, methods and computer program products according to various embodiments of the present application. In this regard, it will also be noted that each of the diagrams and/or flowchart illustration, can be implemented by special purpose hardware-based systems which perform the specified functions or acts, or combinations of special purpose hardware and computer instructions.

The MRV functions, if implemented in the form of software functional modules and sold or used as a stand-alone product, may be stored in a computer readable storage medium. Based on such understanding, the technical solution of the present application or portions thereof that substantially contribute to the prior art may be embodied in the form of a software product stored in a storage medium and including instructions for causing a computer device. In addition, the autonomous system can be realized on an integrated router associated with the autonomous driving, the control system, a remote server, or a cloud network to execute all or part of the steps of the method according to the embodiments of the present application. And the aforementioned storage medium includes various media capable of storing program codes.

The MRV corresponding remedial strategy is provided to maintain the automatic driving function of the MRV can ensure driving safety.

In other embodiments of the present invention further comprises a plurality of calculation units, a sensor fusion unit and a planning control unit which are coupled to one another via a CAN bus. The data exchange unit and the calculation unit are implemented by using FPGA chips, and the sensor fusion unit and the planning control unit are implemented by using SOC chips.

In some embodiments, the control system 300 may also be implemented using a distributed set of computing devices connected by a communications network, or based on cloud. In such systems, a plurality of distributed computing devices operate together to provide services through the use of shared resources. As an example, a plurality of vehicles traveling on a highway may be connected to a common server that provides current road information, speed limit information, and the like, so that each vehicle generates a corresponding driving control instruction based on the common information and a video data stream, sensor data, and the like acquired by each vehicle.

Those of skill in the art would appreciate that the various illustrative logical blocks, modules, circuits, and algorithm steps described in connection with the aspects disclosed herein may be implemented as electronic hardware, computer software, or combinations of both. To demonstrate interchangeability of hardware and software, various illustrative components, blocks, modules, circuits, and steps have been described above generally in terms of their functionality. Whether such functionality is implemented as hardware or software depends upon the particular application and design constraints imposed on the overall system.

While the best modes for carrying out the many aspects of the present teachings have been described in detail, those familiar with the art to which these teachings relate will recognize various alternative aspects for practicing the present teachings that are within the scope of the appended claims.

I claim:

1. A modular robotic vehicle (MRV) comprising:
a chassis or a body;
battery;
a memory;
one or more actuators linking to a plurality of leg arrays;
the plurality of leg arrays positioned on corners and/or sides of the chassis to provide all wheel drive and steering states;
one or more actuator controllers linking to the plurality of leg arrays; drive motors;
drive motor controllers linking to the plurality of leg arrays;
a perception system comprising and utilizing an array of sensors and cameras, wherein the array of sensors and cameras are disposed on portions of the chassis or the body;
a positioning system comprising GPS;
cargo compartments providing storage, accommodating passenger(s) and/or cargo;
one or more master controllers configured for controlling, based on user input commands, each leg of the plurality of leg arrays to provide actuated motion states for the MRV;
a control system comprising processors with software programming for implementing motion control algorithms,
wherein based on user input commands the plurality of leg arrays steer the (MRV) at various steering angles such that the MRV can achieve crab-like drive motion states to transport passengers and/or cargo;
wherein each leg array of the plurality of leg arrays comprises an upper leg unit, a lower leg unit, an ankle, and a wheel including a drive motor connected therein,
wherein based on the user input commands each leg of the plurality of leg arrays provide actuated motion states such that the MRV steps, or walks, or drives on or over roads, terrain or obstacles,
wherein each leg array of the plurality of leg arrays, based on the sensors and cameras, is controlled using a differential steering propulsion or a braking capability such that the wheel operates like a foot for stepping during a walking mode;
wherein the actuators are configured to:
provide a retracted a pitch position for lowering the MRV, or
provide a protracted pitch position to raise the MRV, or
actuate the wheel into opposed respective directions to stabilize the MRV,
wherein when the one or more actuator controllers are powered off the wheel works like a foot for stepping/walking/driving over various ramps, steps, or obstacles;
one or more master controllers and control system components comprising:
receivers, motor sensors, actuator sensors, gyroscope, IMU, associated sensors and cab components configured for monitoring motion states of the MRV,
wherein the one or more actuators and the one or more actuator controllers are configured for:
providing retracted pitch positioning motion to lower the MRV, or
providing protracted pitch positioning motion to raise the MRV, or
providing actuated motion into opposed stepping directions to stabilize the MRV;
wherein the perception system's sensors and cameras are configured for detecting objects and for capturing images surrounding the MRV,
wherein the positioning system utilizes the GPS for establishing and generating a current location, generating routes, mapping destinations,
wherein upon receiving a user input, the control system engages a drive-by-wire control system for selecting an operation mode,
wherein the MRV comprises navigation modes associated with a walking mode, a driving mode, autonomous mode, a sleep mode such that the MRV navigates according to a driving command of a user,
wherein the control system comprising processors with software programming is further configured for controlling each leg array of the plurality of leg arrays,
wherein the control system comprising processors with software programming is linked to the sensors and cameras for providing data to the control system comprising processors with software programming,
wherein control system comprising processors with software programming is further configured for controlling a motion and a position of each leg array of the plurality of leg arrays during the walking mode of the MRV,
wherein the control system comprising processors with software programming is further configured for:
controlling motion and position of each leg array of the plurality of leg arrays during the driving mode, such that the drive motors rotate when powered-on during a drive mode,
controlling motion and placement of the leg array and controlling motion of the wheel based on a GPS planned travel route,
wherein the one or more actuator controllers are configured to perform one of:
retracted a pitch position for lowering the MRV,
protracted pitch position to raise the MRV, or
actuate into opposed respective directions to stabilize the MRV,
a wireless communication system linking the control system comprising processors with software programming to cab components and system components of the MRV such that the user can interface with the MRV;
wherein the user input commands are transmitted from one or various user input devices by-wire and received by the one or more master controllers, wherein when the MRV is manually controlled by a user present within the MRV, the user input devices including one or more of the following: a brake pedal, an accelerator pedal, a human machine interface (HMI) screen, and a steering wheel or a joystick for selecting the driving mode, wherein the user input commands are configured for controlling motion of the actuators and the drive motors for each leg array of the plurality of leg array's to flexibly transpose and hoist the MRV over uneven terrain or over obstacles, and for controlling a speed of the drive motor.

2. The modular robotic vehicle of claim 1, further comprising:
battery compartments;
cargo compartments providing storage;
compartments accommodating passenger(s) and/or compartments accommodating cargo;
compartments accommodating one or more master controllers; and
a control system comprising processors with software programming stored in the memory for implementing motion control algorithms, the control system linking to:
a perception system comprising an array of sensors and cameras, wherein the array of sensors and cameras are disposed on portions of the chassis or the body;
a positioning system comprising GPS;
wherein, the one or more master controllers and the control system comprise the processors with software programming for implementing motion control algorithms and provide data to the memory,
wherein each leg array of the plurality of leg arrays are positioned on corners and/or sides of the chassis to provide all wheel drive and steering states.

3. The modular robotic vehicle of claim 1,
wherein the drive motor actuates each wheel of the leg array of the plurality of leg arrays into opposed respective directions to stabilize the MRV,
wherein, when the drive motor of the wheel of each leg array of the plurality of leg arrays is powered off the wheel works like a foot for stepping/walking/driving over various ramps, steps, or obstacles during various string states.

4. The modular robotic vehicle of claim 1, further comprising:
a positioning system comprising GPS;
cargo compartments providing storage, accommodating passenger(s) and/or cargo;
one or more master controllers;
a control system comprising processors with software programming for implementing motion control algorithms,
Wherein the perception system comprises and utilizes an array of sensors and cameras,
wherein the array of sensors and cameras are disposed on portions of the chassis or the Body,
wherein based on user input commands each leg array of the plurality of leg arrays to steer the MRV at various steering angles such that the MRV can achieve crab-like drive motion states to transport passengers and/or cargo,
wherein each leg array of the plurality of leg arrays comprises an upper leg unit, a lower leg unit, an ankle, and a wheel including a drive motor connected therein, wherein based on the user input commands each leg of the plurality of leg arrays provide actuated motion states,
wherein the actuators of each leg array of the plurality of leg arrays are configured to:
provide a retracted a pitch position for lowering the MRV, or
provide a protracted pitch position to raise the MRV, or
actuate the wheel into opposed respective directions to stabilize the MRV, such that the MRV steps, or walks, or drives on or over roads, terrain or obstacles.

5. The modular robotic vehicle of claim 1,
wherein each leg array of the plurality of leg arrays, based on the sensors and cameras, is controlled using a differential steering propulsion or a braking capability such that the wheel operates like a foot for stepping during a walking mode.

6. The modular robotic vehicle of claim 1,
wherein when the one or more actuator controllers are powered off the wheel works like a foot for stepping/walking/driving over various ramps, steps, or obstacles.

7. The modular robotic vehicle of claim 1,
wherein the one or more master controllers include control system components comprising:
receivers, motor sensors, actuator sensors, gyroscope, IMU, associated sensors and cab components configured for monitoring motion states of the MRV,
wherein the one or more actuators and the one or more actuator controllers are configured for:
providing retracted pitch positioning motion to lower the MRV, or
providing protracted pitch positioning motion to raise the MRV, or
providing actuated motion into opposed stepping directions to stabilize the MRV,
wherein the perception system sensors and cameras are configured for detecting objects and for capturing images surrounding the MRV,
wherein the positioning system utilizes the GPS for establishing and generating a current location, generating routes, mapping destinations,
wherein upon receiving a user input, the control system engages a drive-by-wire control system for selecting an operation mode,
wherein the MRV comprises navigation modes associated with a walking mode, a driving mode, autonomous mode, a sleep mode such that the MRV navigates according to a driving command of a user.

8. The modular robotic vehicle of claim 1,
wherein the control system comprising the processors with software programming is further configured for controlling each leg array of the plurality of leg arrays;
wherein one or more master controllers and control system components comprising:
receivers, motor sensors, actuator sensors, gyroscope, IMU, associated sensors and cab components configured for monitoring motion states of the MRV.

9. The modular robotic vehicle of claim 1,
wherein the control system comprising processors with software programming is linked to the sensors and cameras for providing data to the control system comprising processors with software programming,
wherein the control system comprising processors with software programming is further configured for controlling a motion and a position each leg array of the plurality of leg arrays during the walking mode, such that the MRV steps, walks or achieves combinations of stepping/walking-walking/stepping.

10. The modular robotic vehicle of claim 1,
wherein the control system comprising processors with software programming is further configured for:
controlling motion and position of each leg array of the plurality of leg arrays during the driving mode, such that the drive motors rotate when powered-on during a drive mode such that the MRV drives or achieves combinations of steering in all wheel drive or drive modes steering states.

11. The modular robotic vehicle of claim 1,
wherein the one or more actuator controllers are configured to perform one of:
controlling motion and placement of the leg array and controlling motion of the wheel based on a GPS planned travel route, and system components of the MRV such that the user can interface with the MRV to plan GPS route.

12. The modular robotic vehicle of claim 1, further comprising:
a wireless communication system linking the control system comprising processors with software programming to cab components and system components of the MRV such that the user can interface with the MRV, wherein the one or more actuator controllers are configured to perform one of:
retracted a pitch position for lowering the MRV, protracted pitch position to raise the MRV; or
actuate each leg array of the plurality of leg arrays into opposed respective directions to stabilize the MRV.

13. The modular robotic vehicle of claim 1,
wherein the user input commands are transmitted from one or various user input devices by wire and received by the one or more master controllers,
wherein the user input commands are configured for controlling motion of the actuators and the drive motors for each leg array of the plurality of leg array's to flexibly transpose and hoist the MRV over uneven terrain or over obstacles, and controlling a speed of the drive motor.

14. The modular robotic vehicle of claim 1,
wherein when the MRV is manually controlled by a user present within the MRV the user input devices include one or more of the following: a brake pedal, an accelerator pedal, a human machine interface (HMI) screen, and a steering wheel or a joystick for selecting the driving mode.

15. The modular robotic vehicle of claim 1,
wherein the user input commands are configured for controlling motion of the actuators and the drive motors for each leg array of the plurality of leg array's to flexibly transpose and hoist the MRV over uneven terrain or over obstacles, and for controlling a speed of the drive motor.

16. The modular robotic vehicle of claim 1,
wherein the one or more actuator controllers are configured with a wireless communication system linking the control system comprising processors with software programming to cab components and system components of the MRV such that the user can interface with the MRV.

* * * * *